Ulysses S. Patent [19]

Richardson

[11] 3,724,337
[45] Apr. 3, 1973

[54] EXPANDED-RING SWAB CUP CAGE
[75] Inventor: Murl R. Richardson, Fort Worth, Tex.
[73] Assignee: Oil States Rubber Company, Arlington, Tex.
[22] Filed: May 18, 1971
[21] Appl. No.: 144,441

[52] U.S. Cl. ............................... 92/241, 417/555 A
[51] Int. Cl. ........................... F16j 1/00, F04b 21/04
[58] Field of Search ............ 92/241, 254; 417/555 A; 277/212, 235

[56] References Cited

UNITED STATES PATENTS

| 2,581,981 | 1/1952  | Taylor, Jr. ...................... 417/554 |
| 2,144,997 | 1/1939  | Thaheld .......................... 417/555 A |
| 2,305,282 | 12/1942 | Taylor, Jr. et al. ................ 92/241 |
| 2,711,939 | 6/1955  | Losey .............................. 92/241 |
| 2,917,352 | 12/1959 | Taylor, Jr. ........................ 92/241 |
| 2,965,422 | 12/1960 | Wilson ............................. 92/241 |

Primary Examiner—Alan Cohan
Assistant Examiner—Irwin C. Cohen
Attorney—Alexander & Dowell

[57] ABSTRACT

A reinforcement cage, and method of making, useful in well swab cups of the type having an annular body of elastomeric material with an axial bore extending therethrough, the cage including a series of axially disposed annularly-spaced wire members held at their lower ends between an outer ring of dimensionally stable hardened metal and an inner ring of softer metal which is initially inserted within the wire members and subsequently radially expanded to confine them tightly between the rings which form the base of the cup. The outer ring has an inwardly extending flange covering the lower ends of the wires and the inner ring, and the inner ring has an upwardly extending portion terminating above a flex zone of the wires and above the level of the outer ring to help prevent slumping of the elastomeric body downwardly and outwardly between the wire members.

5 Claims, 6 Drawing Figures

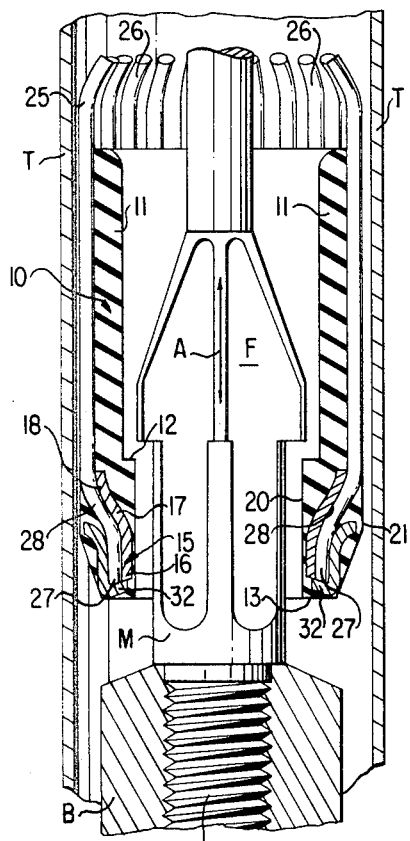
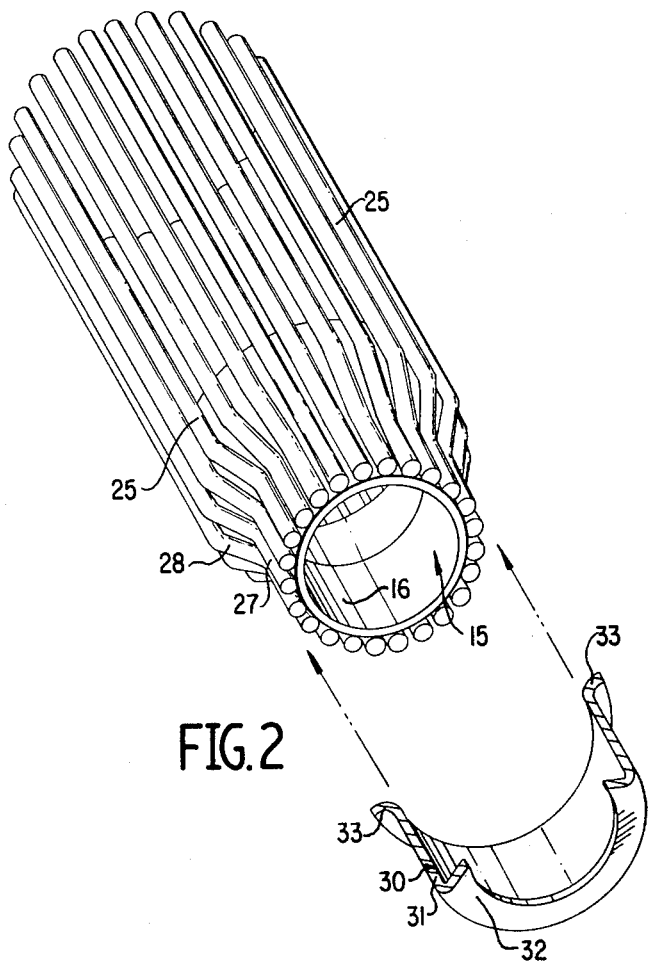
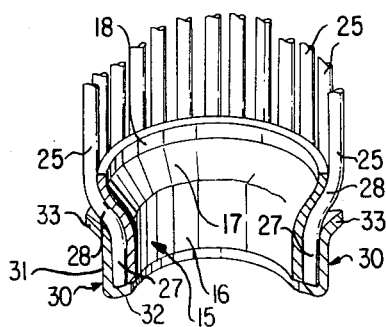
FIG. 1
FIG. 2
FIG. 3
INVENTOR
MURL R. RICHARDSON 3,724,337

EXPANDED-RING SWAB CUP CAGE

This invention relates to improvements in elastomeric swab cups of the type used in oil well tubing strings, and more particularly relates to improved reinforcement cage structures and to methods of making them.

It is the usual practice during manufacture of swab cups of the type with which the present invention is concerned to first assemble a cage including a base and its wires, sometimes using a jig to hold the wires in axially disposed orientation. The assembled reinforcement cage and an uncured elastomeric blank are then placed within a mold which displaces the elastomer around the wires and shapes the cup, some part of the mold frequently holding the wires circumferentially in place during the molding operation. Depending upon the shape of the cup and the mold, the upper ends of the wires can be bent inwardly to prevent snagging of the wires during use either before or after the molding operation is completed. One of the main difficulties involved in a process of the general type just mentioned resides in the fact that the wire cage has a strong tendency to fall apart while it is being transferred from the jig in which it is originally assembled to the mold wherein the rubber is cured around the cage. This tendency makes it awkward to initially assemble the cup prior to curing as well as time consuming from the labor point of view, especially when assembling cups of the type wherein the wires are hooked at their lower ends and are loosely held in holes spaced around the base ring's outside surface. The prior art teaches a number of different ways of holding the wires in alignment with the axis of the cup prior to and during introduction of the elastomeric blank into the cage assembly. For example, U.S. Pat. No. 2,581,981 to Taylor teaches the idea of bending the wires double and then supporting them at their lower ends by a captivating and aligning structure which grips the wires tightly while the assembled cage and a rubber blank are being molded and cured. It is to this latter type of structure that the present invention relates.

A principal object of this invention is to provide an economical manufacturing method and an improved structure for a reinforcement cage which facilitates the original assembly of the cup, holds the wires accurately in place prior to and during molding of the cup, and provides a structure which will maintain the positions of the wires with great strength when the cup is heavily loaded by fluid pressures during the performance of its function in an oil well or other analagous environment.

It is another major object of this invention to provide a structure for a reinforcement wire cage in which the cage includes inner and outer base rings cooperative to provide proper load support for the elastomeric body portion of the cup, while at the same time accurately aligning the lower ends of the wire members. In accordance with the present object, the wires are held tightly between a hardened outer base ring and an inner softer metal ring which has been expanded outwardly toward and against the wires to captivate their lower ends with uniform circumferential spacings while at the same time maintaining the wires in proper axial alignment to facilitate the subsequent assembly of the cage together with an elastomeric blank into a curing mold.

When a swab cup is working under load to raise a column of liquid in a well, the fluid pressures tending to distort the elastomeric body of the cup as well as its metallic reinforcements are very great, as is well known in the prior art. The tendency of the elastomeric body to slump downwardly and outwardly is opposed by the wires and by the base rings of the cup. The wires, especially near their lower central portions, are prevented from undue spreading and downward displacement by the rigid annular base ring of the cup, the wires being made of spring-like material. The base of the cup is part of the reinforcement cage and comprises a ring of hardened steel adequate to confine the lower ends of the wires against radially outward displacement. The lower ends of the wires are tightly pressed from inside against this hardened outer ring by an inner ring. Although the outer ring must be unyielding in order to confine the wires, the inner ring is not subjected to such severe forces during use of the cup and therefore it can be made of a softer material, such as a mild steel. This inner ring initially has a small enough outside diameter that it can be inserted inside the wire cage with the hard outer ring already installed to encircle the lower ends. Subsequently the inner ring is expanded outwardly to captivate the wires between the rings and grip their lower ends very tightly along enough of their lengths to efficiently maintain them in mutually parallel alignment. This arrangement is particularly advantageous because it places the hardened steel ring on the outside of the base where its strength is needed during the service life of the cup, and places the softer expansible ring inside of the base where its softness will not be harmful to the subsequent performance of the cup since the main stresses are outward and downward in the vicinity of the base.

It is another important object of the invention to provide a cup base having an outer ring terminating at its lower end in a radially inwardly extending flange which during use of the cup is seated on a supporting mandrel. This flange underlies the bottom ends of all of the cage wires and also underlies the lower periphery of the inner base ring so that the inner ring as well as the wires are all vertically supported against displacement in the downward direction, i.e. the direction in which fluid loading forces on the cup tend to drive them.

Still a further object of the invention is to provide in a cup base an outer ring having around its upper periphery an outwardly flaring portion which extends out at least even with the outer peripheries of the embedded wires and helps to protect them against damage and wear when the cup strikes against the inner walls of the oil well tubing string. This outwardly flared portion of the outer ring underlies outwardly stepped portions of the wires comprising a zone where the wires are more susceptible to flexing outwardly when the cup body is loaded. The flared portion of the outer ring serves as a seat, or a stop, to limit the bending of the wires at their flex zones located immediately thereabove.

Still another object of the invention is to provide an improved swab cup cage assembly including an inner ring which is not only capable of expansion to confine the lower ends of the reinforcement wires against the rigid outer ring, but this inner ring also includes a central portion which enlarges outwardly to follow the outward step of the reinforcement wires, and then terminates in an upper cylindrical portion which together with the central portion serves to prevent slumping of the elastomeric body downwardly and outwardly between the wires in the vicinity of their flex zones. The cylindrical portion of the inner ring extends partway up the wires beyond their flex zones to a level which is higher than the flared upper portion of the outer ring. The flared portion of the outer ring lies below and outside of the flex zone of the wires whereas the enlarged central portion of the inner ring lies within and above the flex zone of the reinforcement wires.

Another major object of the invention is to provide a method of assembly and a jig for initially holding the wires and the rings in proper mutual orientation while forming a reinforcement cage, and the jig being operative to expand the inner ring outwardly to grip the wires between its outer surface and the inner surface of the hardened ring surrounding the lower ends of the wires. The wires are all held in the exact positions which they should occupy by a plurality of longitudinal grooves in the outer surface of the jig. It is possible either to initially assemble the two rings in the exact position desired on opposite sides of the lower ends of the wires, and then to expand the inner ring outwardly to take its final shape, or alternatively it is possible to assemble the inner ring onto the fixture and then to place the wires over it, and then to press the outer ring into place while simultaneously expanding the inner ring, thereby causing a wiping motion between the lower ends of the wires and the inner surface of the outer ring, such wiping motion tending to slightly flatten the wires and perhaps gouge the inner surface of the outer ring somewhat so as to improve the grip between the two. In either event, a tight grip on the wires results from a sufficient expansion of the inner ring, so that when the jig is disassembled there remains a self-supporting dimensionally stable wire cage ready for insertion into a curing mold together with an elastomeric blank.

Other objects and advantages of the present invention will become apparent during the following discussion of the drawings, wherein:

FIG. 1 is an elevation view partly in cross-section showing a swab cup according to the present invention mounted on a mandrel and located within sucker rod tubing;

FIG. 2 is a partly exploded perspective view illustrating a reinforcing cage according to the present invention;

FIG. 3 is a perspective view partly in section of the base portion of a reinforcement cage made according to the present invention;

Figure 4:
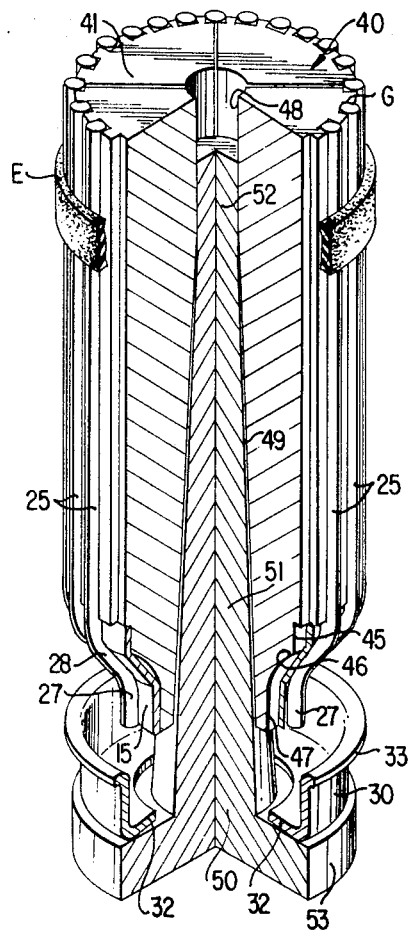
FIG. 4 is a perspective view partly in section showing a manufacturing jig suitable for assembling a cup cage having an expandable inner ring.

Referring now to the drawing, FIGS. 1, 2, and 3 illustrate a swab cup and cage assembly, in which FIG. 1 shows in cross-section a completed swab cup generally designated by the reference numeral 10 and located within a length of sucker rod tubing T into which the swab cup fits loosely when descending, but expands to seal at its upper end when being raised, in a manner well known per se. The illustrated swab cup 10 is supported on a mandrel M which is of conventional design, for instance similar to the mandrel shown in Bowerman U.S. Pat. No. 2,518,275. A mandrel of this type is assembled by screwing together several sections, each of which sections includes an upper portion having a reduced diameter threaded shaft S and a lower portion including an internally threaded boss B joined by a fluted central section F. The elastomeric body 11 of the swab cup includes a shoulder 12 which engages the shoulder of the fluted portion F of the mandrel M when the mandrel is being lowered through fluid located in the well tubing T. Conversely, when the mandrel is raised within the tubing, the cup 10 descends on the mandrel so that its bottom surface 13 seals against the top surface of the next lower boss B. Ordinarily, a multiplicity of such swab cups are carried on a multiple-section mandrel. The various features described so far are well known in the prior art and are believed to require no further explanation. The novelty of the present invention resides in the particular structure of the wire cage and the rings by which the wires are attached to form the base of the cup, and also in the method of making such a structure.

Referring first to the structure of the cup, and more particularly to the structure of its cage assembly, FIGS. 1, 2, and 3 show that the cage assembly comprises an inner base ring 15 including a lower substantially cylindrical portion 16, a central outwardly enlarged portion 17 and an upper portion which is also substantially cylindrical and bears the reference numeral 18, these portions being best seen in FIGS. 1 and 3. The inner ring 15 is embedded in the lower portion of the elastomeric body 11 just above its bottom 13, and the ring 15 extends well up into the body above the lower ends of the wires and their flex zone. The lower portion 16 of the base ring is of such diameter as to lie very near to the bore 20 of the cup where it is covered with only a thin skin of elastomeric material. The central portion 17 of the base ring 15 curves outwardly and then joins an upper portion 18 which lies much nearer to the outer periphery 21 of the cup than to its bore 20. The central and upper portions of the inner base ring together are about as long as, or longer than, the lower portion 16 thereof as measured parallel to the axis A of the cup. The lower portion 16 is expanded to confine the wires against the outer ring and hold them in correct alignment with the axis A of the finished swab cup.

The cage assembly itself as can best be seen in FIGS. 2 and 3 includes an annular series of axially extending, circumferentially spaced, reinforcement wire members 25, these wire members being embedded in the outer periphery of the elastomeric body 11 and extending upwardly beyond the body to terminate in upper ends 26, which in the manner of the prior art are bent generally inwardly so as to prevent snagging thereof upon joints (not shown) of the tubing T. The wires can be bent at any stage during manufacture of the cup which may seem desirable, for example, either before or after molding of the elastomeric body. The wire members 25 just above their lower ends are stepped outwardly away from the center of the rubber body 11 to form a flex zone as shown at 28. Both above and below this stepped zone 28 the wires are axially oriented, lying about tangent with the outer periphery of the body above the zone and approaching the bore 20 near their lower ends 27. The section of each wire including the portion 28 and the bends which are located just above and below it are referred to in this specification as the flex zone where the wires tend to bend in and out as the loading on the cup by the column of fluid being raised by it varies. The flex section of the cage formed by the stepped wires corresponds in shape with the shape of the lower, central, and upper portions of the inner ring 15, and the wires normally lie against them. The bottoms 27 of the wires end substantially even with the bottom periphery of the inner ring 15.

The base of the reinforcement cage also includes an outer ring 30 which has a central cylindrical portion 31 located above an inwardly directed flange 32 and below an outwardly flaring upper portion 33. The ring 30 is made of hardened metal and is dimensionally stable so that it supports the wires 25 against downward and outward displacement even under severe fluid pressure loading of the cup. The flange 32 extending inwardly from the bottom of the ring 30 underlies the lower ends of all of the wire members 25 and prevents their downward displacement. The flange 32 can also underlie part of the lower periphery of the internal ring 15 and help support it against downward displacement. In turn the flange 32 of the outer ring seats upon the elastomeric bead located between the bottom of the flange 32 and the bottom 13 of the cup so that the outer ring 30 derives vertical support as a result of the flange 32 being substantially seated upon the top surface of the boss B as shown in FIG. 1. The outwardly enlarged portion 33 extending above the cylindrical portion 31 of the outer ring curves outwardly more abruptly than the flex zone 28 of the reinforcement wires 25, with the result that the portion 33 of the outer ring is normally out of contact with the wires in their flex zone 28. However, when the cup is heavily loaded and the wires 25 are flexed downwardly and outwardly by fluid pressure acting upon the elastomeric body 11 of the cup, the wires tend to lie upon and be supported by the adjacent surface of the outwardly enlarged portion 33.

Figure 5:
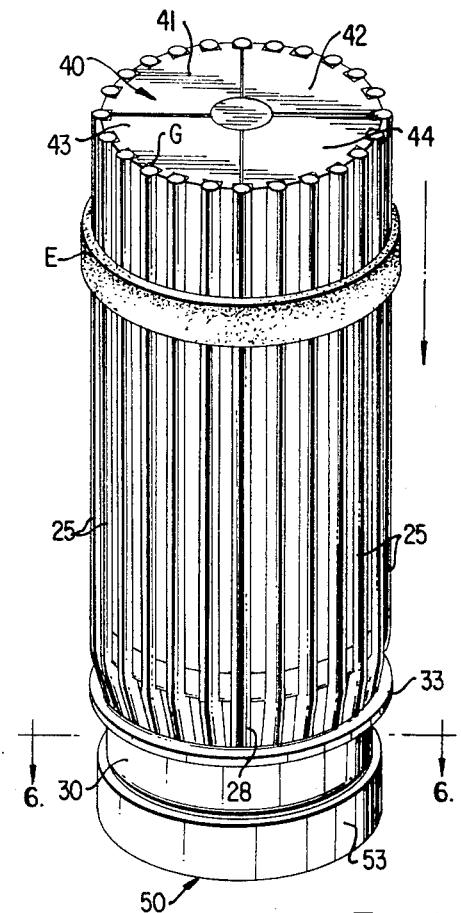
FIG. 5 is a perspective view corresponding with FIG. 4 but showing the jig in fully closed position in which the inner ring has been expanded so that the cage is fully formed.
Figure 6:
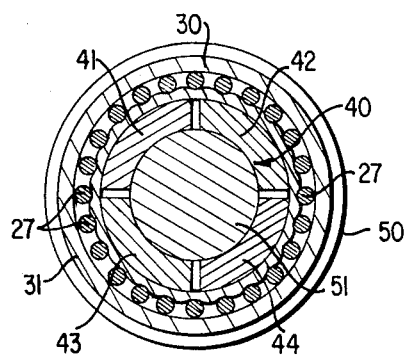
FIG. 6 is a section view taken through the jig and the assembled reinforcement cage along line 6—6 of FIG. 5.

Referring now to the method of making the wire cage, this method is illustrated in FIGS. 4, 5, and 6 illustrating one suitable method for holding the wire reinforcements oriented in annularly-spaced axially-parallel mutual relationship. These wires are held quite accurately by a jig which includes a segmented cylindrical support member 40 having longitudinal grooves G extending down its outer surface to hold the wires 25. In the particular embodiment, the cylindrical member 40 is divided into four segments 41, 42, 43, and 44. The segments narrow at their lower ends, and include an annular groove 45 intended to receive the upper cylindrical portion 18 of the inner ring 15. The groove 45 extends to and joins a concave portion 46 which receives the outwardly enlarged central portion 17 of the inner ring 15. Finally, the lower end of the member 40 is cylindrical as shown at 47 to receive the cylindrical lower portion 16 of the inner ring 15. When thus assembled the four segments, generally referred to by the reference numeral 40 define a composite bore extending axially therethrough, the bore being designated by the reference numeral 48 applied to a cylindrical bore portion while the reference numeral 49 refers to a downwardly and outwardly tapering bore portion. The jig also includes a second member 50 which has an upwardly extending central spindle 51 tapered at an angle matching the angle of taper of the bore 49, the spindle also having a cylindrical upper portion 52. The lower end of the member 50 rests upon an outwardly extending base 53 which in this case is shown as supporting an outer cage ring 30 which sits upon its flange 32. The segments of the cylindrical member 40 can be clearly seen in FIG. 6 which is taken in the vicinity of the base ring 30 of FIG. 5.

In carrying out the process of manufacturing the wire cage, the segments of the member 40 are placed on the spindle 51 in unexpanded position as shown in FIG. 4 and the inner ring 15 is placed over the segmented support portions 45, 46, 47 at the lower end of the member 40. The wires 25 are then placed in the grooves G of the jig, and an elastic band E is passed around the wires as a temporary restraint which serves both to hold the wires and the segments 41, 42, 43, and 44 tightly in place about the spindle 51. In a practical case, it may be easier to assemble these parts maintaining the members shown in FIG. 4 in inverted position so that the rings tend to lie in place as they are assembled and do not have to be held.

When the wires 25 have been secured in place by the elastic band E, they are each rotated so that their stepped zones 28 all occupy radial planes, and then the outer ring 30 is installed over the lower ends 27 of the wires. The assembly on the jig is then placed in a suitable press so that the tops of the segments 40 lie against one plate of the press and the base 53 of the other jig member 50 lie against the other plate of the press, and the press is then actuated to drive the members 40 and 50 together so that the spindle 51 is driven deep into the bores 48 and 49, whereupon the lower ends of the segments in the vicinity of the reference numerals 45, 46, and 47 are wedged outwardly to expand the inner ring 15 radially outwardly and displace its metal into tight contact with and partly around the lower ends 27 of the wires 25 and confine them tightly against the inner surface of the rigid ring 30. Because of the wedge shape of the spindle 51, a tremendous expansion force is developed which tightly confines the wires between the inner and outer rings and jams them rigidly in place. After the two members 40 and 50 of the jig have been pressed together, they are separated and the four segments 41, 42, 43, and 44 as well as the elastic band E are removed from the cage assembly which is then ready for immediate entry into a mold together with a suitable blank of elastomeric material, to form the final swab cup shown in FIG. 1 in a molding and curing operation of a type which is well known in the prior art.

The present invention is not to be limited to the exact form shown in the drawing, for changes may be made therein within the scope of the following claims:

I claim:

1. An improved reinforcement cage assembly for a well swab cup including an annular body of elastomeric material having an outer periphery and having an axial bore therethrough for receiving a supporting mandrel, said assembly comprising:

a. a series of axially-disposed annularly-spaced reinforcing wire members embedded in the cup and lying near the periphery of the elastomeric material in the upper part of the body, and the members being stepped inwardly therebelow at a flex zone and having lower portions embedded in the elastomeric material and disposed near the bore of the cup;

b. an annular outer ring of rigid hard metal embedded in the elastomeric material and surrounding the lower portions of the wire members in contact therewith; and c. an annular inner ring of softer metal embedded in the elastomeric material between the wires and the bore of the cup and of external shape and diameter as to tightly abut and press against and deform partly around the lower portions of the wire members and jam them radially outwardly into contact with the outer ring and confine them tightly between the rings, the inner ring being radially outwardly flared at its upper end to conform with and lie against the stepped zone of the wire members and the outer ring having a flange around its lower end extending inwardly of the cup and underlying the bottoms of the wire members.

2. In an assembly as set forth in claim 1, said flange of the outer ring being fully embedded in said elastomeric material and extending inwardly to underlie the lower end of the inner ring.

3. In an assembly as set forth in claim 1, the outer ring extending upwardly to cover the lower portions of the wire members and flaring outwardly in the vicinity of the flex zone so that it curves gradually outwardly out of contact with the wires in said flex zone.

4. In an assembly as set forth in claim 3, the inner ring having a lower portion which is substantially coextensive with the lower portions of said wire members, and having an outwardly enlarged central portion which is coextensive with said stepped portions of the wire members, and having an upper substantially cylindrical portion extending up along the wire members above said flex zone and above the flaring portion of the outer ring.

5. In an assembly as set forth in claim 4, the central and upper portions of the inner ring being at least as long in the axial direction as said lower portion.

* * * * *